United States Patent [19]
Folks et al.

[11] Patent Number: 6,033,468
[45] Date of Patent: *Mar. 7, 2000

[54] INTERGROUND WHITE BLENDED CEMENT

[76] Inventors: Timothy S. Folks, 7745 Lime Ave., Fontana, Calif. 92336; Patrick M. Hill, 22720 Cardinal St., Grand Terrace, Calif. 92313; Frank T. Sheets, III, 375 E. Grandview, Sierra Madre, Calif. 91024; Richard F. Ball, 672 Lakewood Dr., Riverside, Calif. 92506; Joseph R. Sisneros, 7721 Whitney Dr., Riverside, Calif. 92509; Jesus Uribe, 15361 Smoketree St., Hesperia, Calif. 92345; Curtis W. Forrester, 21475 Webster Ave., Perris, Calif. 92570

[*] Notice: This patent is subject to a terminal disclaimer.

[21] Appl. No.: 08/790,958

[22] Filed: Jan. 29, 1997

[51] Int. Cl.⁷ .......................... C04B 11/30; C04B 14/08; C04B 14/10

[52] U.S. Cl. .......................... 106/741; 106/706; 106/718; 106/721; 106/722; 106/735; 106/741; 106/773; 106/811; 106/DIG. 1

[58] Field of Search .................... 106/705, 706, 106/735, DIG. 1, 741, 718, 721, 722, 812, 773, 811

[56] References Cited

U.S. PATENT DOCUMENTS

| | | | |
|---|---|---|---|
| 1,958,615 | 5/1934 | Finn, Jr. .................................. | 106/741 |
| 2,382,154 | 8/1945 | Jones ....................................... | 106/705 |
| 3,085,022 | 4/1963 | Koch ....................................... | 106/741 |
| 3,692,286 | 9/1972 | Borreill ................................... | 106/741 |
| 4,344,925 | 8/1982 | Pichat et al. ............................ | 106/741 |
| 4,350,533 | 9/1982 | Galer et al. ............................. | 106/695 |
| 4,461,645 | 7/1984 | Roth et al. .............................. | 106/741 |
| 4,464,201 | 8/1984 | Pairon ..................................... | 106/724 |
| 4,684,407 | 8/1987 | Umezawa et al. ...................... | 106/708 |
| 4,717,337 | 1/1988 | Ichiyanagi et al. . | |
| 4,762,561 | 8/1988 | Holub et al. ............................ | 106/695 |
| 4,840,671 | 6/1989 | Lynn et al. .............................. | 106/707 |
| 5,626,665 | 5/1997 | Barger et al. ........................... | 106/706 |

FOREIGN PATENT DOCUMENTS

| | | | |
|---|---|---|---|
| 0609345 | 11/1960 | Canada ................................... | 106/741 |
| 1544464 | 10/1968 | France . | |
| 3230406 | 2/1984 | Germany ............................... | 106/735 |
| 50-072925 | 6/1975 | Japan . | |
| 52-117924 | 10/1977 | Japan . | |
| 54-160020 | 12/1979 | Japan . | |
| 2023480 | 1/1987 | Japan . | |
| 2083248 | 3/1990 | Japan . | |
| 02202584 | 8/1990 | Japan . | |
| 04050151 | 2/1992 | Japan . | |
| 2022041 | 11/1991 | Spain . | |
| 537051 | 11/1976 | U.S.S.R. ................................ | 106/741 |
| 595 265 | 3/1978 | U.S.S.R. . | |
| 619455 | 8/1978 | U.S.S.R. ................................ | 106/741 |
| 718394 | 2/1980 | U.S.S.R. ................................ | 106/741 |
| 787384 | 12/1980 | U.S.S.R. ................................ | 106/741 |
| 863528 | 9/1981 | U.S.S.R. ................................ | 106/741 |
| 1409602 | 7/1988 | U.S.S.R. . | |
| 1608150 | 11/1990 | U.S.S.R. . | |
| 1726412 | 4/1992 | U.S.S.R. . | |
| 320597 | 10/1929 | United Kingdom ................... | 106/741 |
| 374455 | 6/1932 | United Kingdom ................... | 106/741 |
| 1090539 | 11/1937 | United Kingdom ................... | 106/741 |
| 2159512 | 12/1985 | United Kingdom . | |

OTHER PUBLICATIONS

"Possibilities of White Cement Production Domestically" Pecari, Atlania, Bulgaria Shkencame Nat. (no month 1985), 39(1), pp. 75–80.

"$CaF_2$ and $CaSO_4$ in White Cement Clinker Production", Adv. Cem. Res. 9(35), pp. 105–113 (no month 1997) Blanco et al.

Advanced Cement Technologies, "High–Reactivity Metakaolin Engineered Mineral Admixture for Use with Portland Cement," Aug. 1, 1995.

Caldarone, M., Gruber, K., Burg, R., "High–Reactivity Metakaolin: A New Generation Mineral Admixture," Nov. 1994.

Advanced Cement Technologies brochure, "PowerPozz The Power of Cement Unleashed" (No Date Available).

Kuennen, T., "Metakaolin Might," *Concrete Products*, May 1996.

Advanced Cement Technologies bulletin, "10.104—Compressive Strength" (No Date Available).

Advanced Cement Technologies bulletin, 10–104—Alkali–Silica Reaction (ASR) Nov. 27, 1995.

Advanced Cement Technologies bulletin, "10.101—General Use," Aug. 1, 1995.

Concrete Products, Oct. 1995, "Mix Technology Awaits Transfer".

Advanced Cement Technologies brochure, "PowerPozz" (No Date Available).

Advanced Cement Technologies, Apr. 17, 1996, "Material Safety Data Sheet".

Englehard Corporation, "MetaMax High Reactivity Metakaolin (HRM) for Improved Pre–Cast Concrete, A Moist––Cured & Hot–water–cured Study," Jan. 1997.

Engelhard Corporation, "Improvement of Class F Fly Ash Concrete By the Addition of MetaMax High Reactivity Metakaolin (HRM)," Jan. 1995.

Marsh, D., "An Alternative to Silica Fume?," *Concrete Products*, Nov. 1994.

Engelhard Corporation leaflet, "What Makes MetaMax High Reactivity Metakaolin Stand Out? Let Us Enlighten You.," 1996 no month.

Engelhard Corporation leaflet, "MetaMax EF High Reactivity Metakaolin (HRM) Pozzolanic Mineral Admixture," 1997 no month.

(List continued on next page.)

*Primary Examiner*—Anthony Green
*Attorney, Agent, or Firm*—R. Darryl Burka; Michael Smith

[57] ABSTRACT

A composition comprises anhydrous alumino-silicate, diatomaceous earth, and/or other natural pozzolans, white clinker, and white gypsum interground together and in a ratio by weight of 5–20% anhydrous alumino-silicate, diatomaceous earth, and/or other natural pozzolans, 3–7% gypsum, and 73–92% white clinker.

41 Claims, 1 Drawing Sheet

OTHER PUBLICATIONS

Engelhard Corporation, "Improving Mortars with MetaMax High Reactivity Metakaolin," Nov. 1996.

Engelhard Corporation, "MetaMax High Reactivity Metakaolin (HRM) Pozzolanic Mineral Admixture," 1997 no month.

Lea, F., "The Chemistry of Cement and Concrete," 1971, p. 120 no month.

Ramachandran, V., "Concrete Admixtures Handbook Properties, Science, and Technology," 1984 no month.

Balogh, A., "High–reactivity Metakaolin," *Concrete Construction,* Jul. 1995, vol. 40, No. 7.

Engelhard Corporation leaflet, "ASTM C–109 Mortar Cube Study" (No Month Available).

Engelhard Corporation leaflet, "MetaMax EF High Reactivity Metakaolin (HRM) Pozzolanic Mineral Admixture," 1994 no month.

"A Pozzolan for Today and Tomorrow" leaflet (No Date Available).

Caldarone, M. & K. Gruber, "High Reactivity Metakaolin—A Mineral Admixture for High–Performance Concrete," 1995, pp. 1016–1023 no month.

Engelhard Corporation, "Benefits of MetaMax High Reactivity Metakaolin (HRM): Addition v. Replacement," 1995 no month.

Kosmatka, S. & W. Panarese, "Design and Control of Concrete Mixtures," 13th Ed., 1990, pp. 68–73 no month.

Malhotra, V., "Fly Ash, Silica Fume, Slag, and Natural Pozzolans in Concrete," vol. I, Proceedings Fourth International Conference, Istanbul, Turkey, May 1992, pp. 655–669.

Detwiler, R., Bhatty, J. & S. Bhattacharja, "Supplementary Cementing Materials for Use in Blended Cements," 1996, pp. 24–26, 55 no month.

Dunstan, E., "Power Plant Construction Products—Ash," Jan. 1990.

Advanced Cement Technologies, LLC leaflet, No Date Available.

Advanced Cement Technologies leaflet, No Date Available.

Gruber K. & S. Sarkar, "Exploring the Pozzolanic Activity of High Reactivity Metakaolin," Feb. 1996, *World Cement,* vol. 27, No. 2.

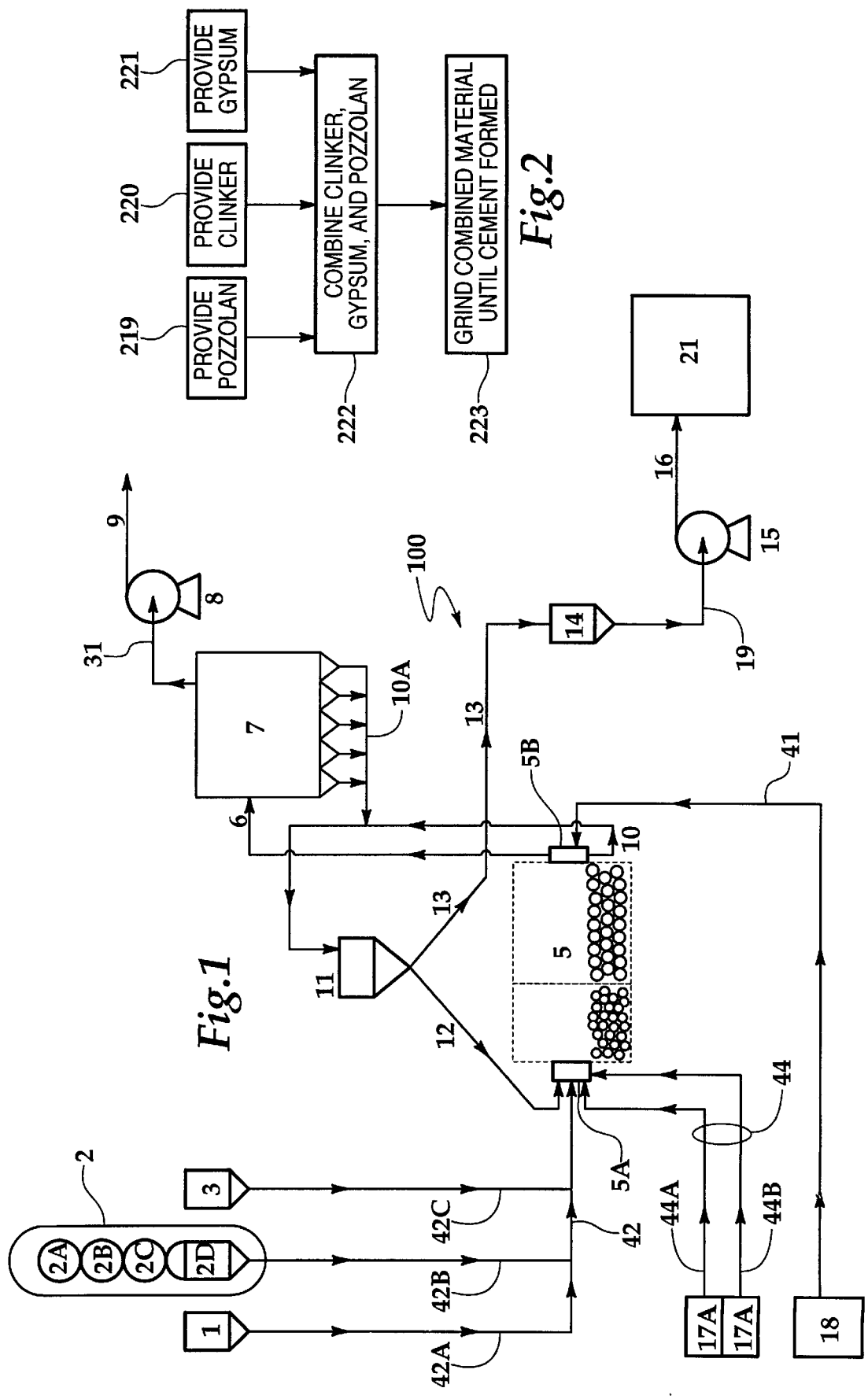

INTERGROUND WHITE BLENDED CEMENT

PARTIAL WAIVER OF COPYRIGHT PURSUANT TO 1077 O.G. 22(Mar. 20, 1987)

© Copyright. 1997. Riverside Cement Company. All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright rights has no objection to the facsimile reproduction by anyone of the patent document or patent disclosure, as it appears in the United States Patent and Trademark Office patent file or records, but otherwise reserves all copyright rights whatsoever.

FIELD OF INVENTION

A present invention relates to the field of systems, apparatus, and processes used to manufacture white cement, the actual white cement itself and the applications of the white cement.

CROSS-REFERENCE TO RELATED APPLICATIONS

The following patent applications, which are filed herewith, are incorporated by reference:

| Reference Number/Ser. No. | Title | Author |
|---|---|---|
| 6208-11-A 08/790,957 | Process to make Interground, White Blended Cement | Timothy S. Folks Patrick M. Hill Frank T. Sheets, III Richard F. Ball Joseph R. Sisneros |
| 6208-11-B 08/790,899 | Apparatus and Systems to make Interground, White, Blended Cement | Timothy S. Folks Patrick M. Hill Frank T. Sheets, III Richard F. Ball Joseph R. Sisneros |

BACKGROUND

A primary application for white cement is as an ingredient in white plaster, white concrete, or white mortar. Over the years, a number of people have attempted to create these cements with a few, rather crude, ad hoc methods. One existing method adds portions of pre-ground, light-colored compounds to cement in varying proportions along with white sand and water at an actual job site by hand to create a higher strength white cement. Another existing approach mixes or combines pre-ground, light-colored compounds with cement immediately prior to packaging and selling the resulting blended white cement to the public. White, diatomaceous earth is the pre-ground, light colored compound most commonly used by these methods. Unfortunately, use of the product created by existing methods as an ingredient in plaster, concrete, and mortar is problematic. Specifically, the characteristics of the cements created with existing methods often vary dramatically from mixture to mixture as the relative amounts of each sub-component vary and the degree of the mixing of the sub-components vary, which can affect the quality of the plaster, concrete, and mortar in which these cements are used. These characteristics include coloration, durability, workability, preparability, set time, and surface texture. In addition, the plaster, concrete, and mortar created using the cements created with existing procedures also have spotting and cracking problems.

SUMMARY

Preferred processes generally comprise the following steps: (i) providing anhydrous alumino-silicate (2 $SiO_2$—$Al_2O_3$), diatomaceous earth and/or other natural pozzolans, white clinker, and white gypsum; (ii) combining the anhydrous alumino-silicate, diatomaceous earth and/or other natural pozzolans, white clinker, and white gypsum together; and (iii) intergrinding the anhydrous alumino-silicate, diatomaceous earth and/or other natural pozzolans, white clinker, and white gypsum together to form an interground, white, blended cement. The anhydrous alumino-silicate, diatomaceous earth and/or other natural pozzolans, white clinker, and white gypsum can be combined together in one or multiple steps after step (i) and, in some instances, before step (iii). A preferred ratio is 8% anhydrous alumino-silicate, diatomaceous earth, and/or other natural pozzolans, 3.5% white gypsum, and 88.5% white clinker, but other ratios are also preferred. Specifically, ratios having amounts in the following ranges are also preferred: 5–20% anhydrous alumino-silicate, diatomaceous earth and/or other natural pozzolans, 3–7% white gypsum, and 73–92% white clinker. Also, note that the actual make-up of the portion of anhydrous alumino-silicate, diatomaceous earth, and/or other natural pozzolans may vary. For instance, if the total portion of anhydrous alumino-silicate, diatomaceous earth, and/or other natural pozzolans is approximately 8%, one fourth of this amount (or 2% of the total) may be anhydrous alumino-silicate, one fourth of this amount (or 2% of the total) may be diatomaceous earth, and one half (or 4% of the total) may be other natural pozzolans. The actual range of each ingredient generally varies with the quality of the individual ingredients themselves, namely the anhydrous alumino-silicate, diatomaceous earth, and/or other natural pozzolans, white gypsum, and white clinker. The reflectance of the individual ingredients is checked before the ingredients are combined and/or interground together in the grinding mill, so that the individual ingredients can be preselected and/or prescreened. The reflectance of the interground, white, blended cement is also checked on an on-going basis at specific points throughout the manufacturing process (e.g., after the interground, blended cement leaves the grinding mill) to ensure that the resulting, interground, white, blended cement conforms to desired specifications concerning the reflectance or color. Specifically, the reflectance of the individual ingredients and of the resulting, interground, white, blended cement is checked with a colorimeter to ensure the reflectance of the individual ingredients and of the resulting, interground, white, blended cement is above a certain threshold. Additional steps may also be added that provide coolant(s) and grinding aid(s) and that combine the coolant(s) and grinding aid(s) with the anhydrous alumino-silicate, diatomaceous earth and/or other natural pozzolans, white clinker, and white gypsum together in a grinding mill. The anhydrous alumino-silicate, diatomaceous earth and/or other natural pozzolans, white clinker, and white gypsum are preferably interground together in a ball mill.

Preferred embodiments of the manufacturing system and apparatus are comprised of a pozzolan storage housing, a clinker storage housing, a gypsum storage housing, and a grinding mill. The pozzolan storage housing stores the anhydrous alumino-silicate, diatomaceous earth and/or other natural pozzolans; the clinker storage housing stores the white clinker; and the gypsum storage housing stores the white gypsum. The grinding mill is used to intergrind the anhydrous alumino-silicate, diatomaceous earth and/or other natural pozzolans, white clinker, and white gypsum together. Transportation equipment transfers the anhydrous alumino-silicate, diatomaceous earth and/or other natural pozzolans from the pozzolan storage housing to the grinding mill, the white clinker from the clinker storage housing to the grinding mill, and the white gypsum from the gypsum storage housing to the grinding mill. Transportation equipment also transfers the resulting, interground, white, blended cement away from the grinding mill. In some preferred embodiments, one or more separators may be used. Transportation equipment transfers the interground, white, blended cement from the grinding mill to any number of separators. At least one separator separates the interground, white, blended cement received from the grinding mill into a fine portion and a coarse portion. Transportation equipment transfers the coarse portion back to the grinding mill and transfers the fine portion away from the separator. In addition, preferred systems are also comprised of a grinding aid storage housing and a coolant storage housing. The grinding aid storage housing stores grinding aids (e.g., Di-Ethylene Glycol and Acetic Acid) and the coolant storage housing stores a coolant (e.g., water). The grinding aids and the coolant are transferred to the grinding mill from their respective storage housings via transportation equipment.

The preferred, interground, white, blended cement (preferably created with the preferred processes, systems, and apparatus discussed above) have a number of applications, particularly as a primary ingredient in cementitious materials (e.g., concrete, mortar, and plaster) used for various products. These products include, but are not limited to, pool plaster for swimming pools, concrete blocks, concrete roof tile, stucco, precast panels, grout, mortar, and floor tiles. Moreover, since white, blended cement forms the perfect neutral base to which various colors can be added to create colored cement (e.g., pastel colors, such as coral, pink, light blue, etc.), the preferred, interground, white, blended cement is used to manufacture colored cement, which is, in turn, used as a primary ingredient in colored cementitious materials and associated products.

There are a number of advantages of the preferred processes, systems, and apparatus used to male the preferred, interground, white, blended cement. There are also a number of advantages of the preferred, interground, white, blended cement when used in associated applications, such as those discussed above. First, regarding the advantages of the preferred processes, systems, and apparatus, the preferred embodiments produce the interground, white, blended cement in a highly efficient and cost-effective way. As discussed below, intergrinding the components provides greater control over the mixing ratios and over the final color and, thus, the preferred, interground, white, blended cement is substantially more consistent in terms of its composition and in its properties.

Second, regarding the advantages of the preferred, white, interground, blended cement when used in associated applications, the durability of the applications using the preferred, interground, white, blended cement is substantially increased over existing products, in part, due to the pozzolanic activity of the anhydrous alumino-silicate, diatomaceous earth and/or other natural pozzolans. The anhydrous alumino-silicate, diatomaceous earth and/or other natural pozzolans is believed to change the somewhat water soluble hydrated lime (e.g., calcium hydroxide or $Ca(OH)_2$), which is a hydration product, into a relatively insoluble calcium silicate hydrate and/or calcium aluminate hydrate. This pozzolanic action reduces the frequency and severity of a number of problems that affect the durability of plaster products, such as spot etching, surface erosion, chemical attack, and strength loss due to leaching of hydration products and calcium nodules. In addition, the use of the preferred, interground, white, blended cement provides superior workability of concrete, plaster, and mortar products (including pool plaster), in part, due the to the lubricating properties of anhydrous alumino-silicate, diatomaceous earth and/or other natural pozzolans. Moreover, the increased workability and extended set time of the concrete, plaster, and mortar products enables workmen to smooth or finish plaster to a substantially greater degree than heretofore thought possible. Also, the use of the preferred, interground, white, blended cement helps the concrete, plaster, and mortar products enhance the color consistency and resist trowel bums and non-uniform color variations. Reducing trowel bums and non-uniform color variations is especially important in applications of plaster products, since trowel bums and non-uniform color variations contribute to discoloration of the plaster finish. Similarly, when the preferred, interground, white, blended cement is used, the frequency and severity of modeling or discoloration of the cementitious products is reduced, due, in part, to the slow setting properties and lower heat of the hydration of the preferred, interground, white, blended cement. Likewise, applications using the preferred, interground, white, blended cement have increased compressive strength, due, in part, to the conversion of relatively weak hydrated lime to the stronger calcium silicates hydrate and calcium aluminate hydrate. Applications using the preferred, interground, white, blended cement have greater density and reduced shrinkage and permeability.

Finally, the preferred, white, interground, blended cement is a blended hydraulic cement that meets the requirements of A.S.T.M. C-595 "Blended Hydraulic Cement Type I-PM (pozzolan modified)" and/or Type IP, so it is compatible with existing methods that use cement and existing applications of cement. Relevant portions of the Standard Specification of Blended Hydraulic Cements is shown in Appendix A, which is herein incorporated by reference.

Other advantages will be explained in greater detail below.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein:

FIG. 1 is a system diagram showing a preferred embodiment of the manufacturing equipment and/or apparatus used to manufacture the preferred, interground, white, blended cement; and FIG. 2 is a flow diagram showing the series of steps of a preferred process used to manufacture a preferred, interground, white, blended cement, which is preferably implemented by the system diagram shown in FIG. 1.

DETAILED DESCRIPTION OF THE PREFERRED EMBODIMENT

The present inventions will be described by referring to systems, apparatus, and methods showing various examples of how the inventions can be made and used.

Also, at the outset, as a point of reference only, please note the following definitions provided by *Standard Specification for Blended Hydraulic Cements*: blended hydraulic cement means a hydraulic cement consisting of two or more inorganic constituents (at least one of which is not Portland cement or Portland cement clinker) which separately or in combination contribute to the strength-gaining properties of the cement (made with or without other constituents, processing additions and functional additions, by intergrinding or other blending); Portland cement means a hydraulic cement produced by pulverizing Portland-cement clinker, usually containing calcium sulfate; Portland-cement clinker means a partially fused clinker consisting primarily of hydraulic calcium silicates; and pozzolan means a siliceous or siliceous and aluminous material, which in itself possesses little or no cementitious value but which will, in finely divided form and in the presence of moisture, chemically react with calcium hydroxide at ordinary temperatures to form compounds possessing cementitious properties. Note the term "consisting of" and "consisting primarily of" in the above definitions should not be read as "consisting only of."

FIG. 1 illustrates system diagram 100 of the manufacturing equipment and/or apparatus used to implement the preferred process shown in FIG. 2 used to manufacture the preferred, interground, white, blended cement. As will be discussed below, the color of a cement is a function of the reflectance of the cement; the higher the reflectance, the brighter or whiter the color. Note that when referring to FIG. 1, for simplicity purposes, the primary ingredients are described with general terms, such as anhydrous aluminosilicate, diatomaceous earth and/or other natural pozzolans, white clinker, and white gypsum. The specific nature of each ingredient used to manufacture the preferred, interground, white, blended cement along with the preferred composition of the preferred, interground, white, blended cement will be discussed thereafter. Pozzolan storage housing 1 stores anhydrous alumino-silicate, diatomaceous earth and/or other natural pozzolans; clinker storage housing 2 stores white clinker; and gypsum storage housing 3 stores white gypsum. Pozzolan storage housing 1, clinker storage housing 2, and gypsum storage housing 3 are preferably silos. Note clinker storage housing 2 is preferably comprised of four (4) independent silos 2A, 2B, 2C, and 2D. Also, please note that there are numerous combinations, groupings, or arrangements of pozzolan storage housing 1, clinker storage housing 2 (and silos 2A, 2B, 2C, and 2D), and gypsum storage housing 3, which can be arranged to ultimately deliver appropriate portions to grinding mill 5. Consequently, while the arrangement of pozzolan storage housing 1, clinker storage housing 2, and gypsum storage housing 3 in FIG. 1 shows anhydrous alumino-silicate, diatomaceous earth and/or other natural pozzolans, white gypsum, and white clinker being deposited in layers, with anhydrous alumino-silicate, diatomaceous earth and/or other natural pozzolans being deposited on the first (or bottom) layer, white clinker deposited as the second (or middle) layer, and white gypsum deposited as the third (or top) layer, other arrangements of the storage facilities and resulting layers of deposits (and other methods and manners of deposits) are possible. For instance, white clinker can be deposited at multiple times in multiple layers.

In addition, while FIG. 1 shows the use of transportation line 42A, transportation line 42B, and transportation line 42C, all of which are independent from one another, extending from pozzolan storage housing 1, clinker storage housing 2, and gypsum storage housing 3, respectively, to transportation line 42, other transportation lines can be added that transfer the deposits directly from pozzolan storage housing 1, clinker storage housing 2, and gypsum storage housing 3 to grinding mill 5. Also, although not shown in FIG. 1, anhydrous alumino-silicate, diatomaceous earth and/or other natural pozzolans, white clinker, and white gypsum can also be combined in a cement feed mix storage housing or feed chute and, if desired, actively mixed together, prior to be delivered to grinding mill 5. The output of pozzolan storage housing 1, clinker storage housing 2, and gypsum storage housing 3 is controlled in FIG. 1 and the portion of raw materials actually deposited by pozzolan storage housing 1, clinker storage housing 2, and gypsum storage housing 3 are weighed by transportation line 42A, transportation line 42B, and transportation line 42C, respectively.

The combination of the anhydrous alumino-silicate, diatomaceous earth and/or other natural pozzolans, white clinker, and white gypsum is transferred to grinding mill 5 via transportation line 42 to first entry 5A of grinding mill 5. Grinding mill 5 is preferably a two-compartment, ball grinder that intergrinds the anhydrous alumino-silicate, diatomaceous earth and/or other natural pozzolans, white clinker, and white gypsum together. Note that the dimensional quality of the anhydrous alumino-silicate, diatomaceous earth and/or other natural pozzolans, white clinker, and white gypsum may vary extensively from substance to substance as well as from batch to batch, which, in part, necessitates the use of grinding mill 5. For instance, white clinker typically has dimensions between sand grains and 2–3" spherical chunks; the anhydrous alumino-silicate, diatomaceous earth, and/or other natural pozzolans is pelletized in a cylindrical shape having the dimensions of ¾–1" long and ¼–½" in diameter; and the gypsum is generally in 1½" semi-spherical chunks. Grinding mill 5 intergrounds these substances together to produce a good quality, consistently mixed and sized cement. Note grinding mill 5 is preferably only filled to a maximum of 50% of its total volume (33% to 35% Ball Charge and 15% to 17% of feed) to provide enough space for the grinding process to occur.

Grinding aid storage housing 17 stores grinding aid, which is also selectively transferred to grinding mill 5 via transportation line 44 to first entry 5A of grinding mill 5. As manufactured by W. R. Grace or others, grinding aids are generally comprised of a number of chemicals, such as Di-Ethylene Glycol ("DEG") and/or Acetic Acid, that make the grinding process more efficient. Note grinding aid storage housing 17 is preferably comprised of two compartments: first grinding aid storage compartment 17A and second grinding aid storage compartment 17B. First grinding aid storage compartment 17A is used to store DEG. Second grinding aid storage compartment 17B is used to store Acetic Acid. DEG is transferred to grinding mill 5 via transportation line 44A; Acetic Acid is transferred to grinding mill 5 via transportation line 44B. Transportation line 44A and transportation line 44B combine to form transportation line 44. Similarly, water storage housing 18 stores water or another coolant, which assists the grinding mill 5 in grinding and is selectively transferred to grinding mill 5 via transportation line 41 to second entry 5B of grinding mill 5. The coolant helps control the internal temperature of grinding mill 5, which may approach 180° F. to 230° F. Temperatures greater than 250° F. are not preferred. The output of the grinding mill 5 is transferred to separator 11 via transportation line 10, which extends from grinding mill 5 to separator 11.

When the preferred, interground, white, blended cement exits grinding mill 5 via second entry 5B, the interground product is comprised of coarse and fine portions. Separator 11 separates the coarse portions from the fine portions. Coarse material is returned into grinding mill 5 via transportation line 12 and through first entry 5A. Fine material is transferred to temporary storage housing 14 via transportation line 13. Coarse portions are generally defined as being kept by a 200 mesh or 200 screen, whereas fine portions are generally defined as 93–98% passing a 325 mesh.

Pump 15 (Claudius Peters "X" pump), transportation line 19, and transportation line 16 transfers the preferred, interground, white, blended cement to a final storage location 21, from which the preferred, interground, white, blended cement is ultimately provided to the customer in bulk form or, alternatively, packaged and then delivered to a customer. Transportation line 6 transfers extraneous dust from grinding mill 5 to dust collector 7. Fan 8 creates an induced draft from dust collector 7 and emits portions of cleaned air generated by grinding mill 5 to atmosphere via transportation line 31, and exit 9. Dust is returned to transportation line 10 via transportation line 10A.

The flow diagram shown in FIG. 2 illustrates the major steps of the preferred process implemented in FIG. 1. In particular, steps 219, 220, and 221 are directed toward providing the raw materials in the proper proportions discussed above, namely anhydrous alumino-silicate, diatomaceous earth and/or other natural pozzolans, white clinker, and white gypsum, respectively. In step 222, anhydrous alumino-silicate, diatomaceous earth and/or other natural pozzolans, white clinker, and white gypsum are combined and/or mixed to some extent. In fact, as discussed above, alumino-silicate, diatomaceous earth and/or other natural pozzolans, white clinker, and white gypsum can be combined and mixed before being deposited in grinding mill 5 (in FIG. 1) or combined and mixed actually in grinding mill 5 itself. Alternately, appropriate portions of white gypsum and white clinker are combined together in a single step, the output of which is conveyed to the inlet of the grinding mill 5 or are combined together in stages, before being conveyed directly to the grinding mill 5. In step 223, the mixed or combination of anhydrous alumino-silicate, diatomaceous earth and/or other natural pozzolans, white clinker, and white gypsum are then interground together, the vast majority of particles in the resulting interground, white, blended cement, individually and collectively, meet desired size limitations and consistency requirements.

While the ratio of anhydrous alumino-silicate, diatomaceous earth and/or other natural pozzolans, white clinker, and white gypsum may be mixed in a variety of ratios, preferred embodiments generally deposit anhydrous alumino-silicate, diatomaceous earth and/or other natural pozzolans, white clinker, and white gypsum on transportation line 42 in the following ratio by weight: 8% anhydrous alumino-silicate, diatomaceous earth, and/or other natural pozzolans, 3.5% white gypsum, and 88.5% white clinker. As a general rule, preferred embodiments of the interground, white, blended cement have ratios by weight in the following ranges: 5–20% anhydrous alumino-silicate, diatomaceous earth and/or other natural pozzolans, 3–7% white gypsum, and 73–92% white clinker. Note the anhydrous alumino-silicate, diatomaceous earth and/or other natural pozzolans used in preferred embodiments are in a pellet form and the white clinker is preferably a White Portland Cement Type I clinker. White Portland Cement Type I clinker and anhydrous alumino-silicate are preferred, in part, because of their light color. However, diatomaceous earth and/or other natural pozzolans are also preferred in addition to or in lieu of anhydrous alumino-silicate, because they react quickly when mixed with water, which provides greater strength development. As a result, the actual make-up of the portion of anhydrous alumino-silicate, diatomaceous earth, and/or other natural pozzolans may vary. For instance, if the total portion of anhydrous alumino-silicate, diatomaceous earth, and/or other natural pozzolans is approximately 8%, one fourth of this amount (or 2% of the total) may be anhydrous alumino-silicate, one fourth of this amount (or 2% of the total) may be diatomaceous earth, and one half (or 4% of the total) may be other natural pozzolans. The actual range of any ingredient generally varies with the quality of the individual ingredients themselves, namely the anhydrous alumino-silicate, diatomaceous earth, and/or other natural pozzolans, white gypsum, and white clinker.

Cements are generally divided into three general groupings: grey cement, light-colored cements (sometimes referred to as Block/Buff/Masonry cements), and white cements. The color of each grouping is a distinguishing characteristic, but not the only distinguishing characteristic. There are a number of factors that affect the nature and characteristics of the resulting coloration of the preferred, interground, white, blended cement (and of the plaster, mortar, and concrete made with the preferred, interground, white, blended cement). Anhydrous alumino-silicate, diatomaceous earth and/or other natural pozzolans typically do not significantly change the resulting coloration of the interground, white, blended cement. White clinker and white gypsum are preferably used to manufacture white cement. White clinker and white gypsum and, consequently, the cements in which these ingredients are added are sensitive to any and all off-color contaminants, so a colorimeter is preferably used to ensure consistency and stability of the color quality of the individual ingredients of the preferred, interground, white, blended cement, anhydrous alumino-silicate, diatomaceous earth and/or other natural pozzolans, white gypsum, and white clinker, and of the interground, white, blended cement itself. A colorimeter measures a product color or reflectance against a brilliant white standard (see A.S.T.M. E-306-1996, a copy of which is shown in Appendix B and herein incorporated by reference). The colorimeter used in preferred embodiments is manufactured by Hunter Lab, but there are other colorimeters manufactured by other companies that are commercially available. The Hunter Lab colorimeter uses the "$R_d$" scale (termed R sub d scale) to obtain a percentage of white as referenced to the brilliant or perfect (100%) white. The "a" & "b" scales measure other hues of color; red/green tinting, and blue/yellow tinting. Colorimeters manufactured by other companies may use other instruments to measure the color. The instrument and the scale is preferably specified when using the term reflectance, since the actual measurements may vary from instrument-to-instrument and standard-to-standard.

The calorimeter is used when manufacturing the preferred, interground, white, blended cement to determine whether the product being tested is above a certain threshold, which differs from the use of a calorimeter when manufacturing other cements, which is to only determine whether the color in a batch or production is consistent. Specifically, the colorimeter is used to measure the reflectance of the raw materials, including white clinker, white gypsum, and the anhydrous alumino-silicate, diatomaceous earth, and other natural pozzolans, before the materials are combined and interground together to ensure that they meet certain specifications governing the color. While the chemistry of the raw materials used for white cement and other cements, such as grey cements, are similar in some respects, there are important differences, namely the percentage of iron ($Fe_2O_3$) in white clinker is extremely low (desirably "0" percent). The calorimeter is also used to check the color of the preferred, interground, white, blended cement produced during (and after) the manufacturing process itself. A composite is usually removed from separator 11 and taken to the laboratory to be tested by the calorimeter. Although not always necessary, the reflectance of white gypsum can be measured as well. Note, while white gypsum is preferred, it is possible to use other grades of gypsum.

During the intergrinding process (performed in grinding mill 5 in FIG. 1 and step 222 in FIG. 2), the air separator, the air flow through the system, or the overall amount of material through system 100 are adjusted to influence subtle changes to the reflectance of the preferred, interground, white, blended cement. However, the coloration of the preferred, interground, white, blended cement can be changed by altering the quality (e.g., as measured by color) and quantity of the white clinker being fed into grinding mill 5, the quality (e.g., as measured by color) and quantity of the anhydrous alumino-silicate, diatomaceous earth, and/or natural pozzolans. In addition, higher product fineness does produce a brighter reflectance (or more white) of the preferred, interground, white, blended cement; conversely, lower fineness produces a preferred, interground, white, blended cement that is less reflective (or less white). As a result, the fineness of the resulting, interground, white, blended cement (as produced by grinding mill 5) is monitored and, in some instances, adjusted to enhance the light color of the preferred, interground, white, blended cement. The fineness of the resulting, interground, white, blended cement is checked with a Blaine apparatus, which measures fineness as a function of grains/$cm^2$. Note, however, care must be exercised when adjusting Blaine fineness, since the fineness of the preferred, interground, white, blended cement has as a definite relationship to strength and setting time of the cementitious products manufactured with the preferred, interground, white, blended cement. Fortunately, to a point, increased fineness increases the resulting strength of the preferred, interground, white, blended cement.

The typical, preferred target for the preferred, interground, white, blended cement is an 87.5 reflectance on the "$R_d$" scale and the white clinker used preferably has a reflectance of greater than or equal to 80.0 on the "$R_d$" scale. By comparison, basic Type II Grey Portland Cement products typically possess a reflectance range of to 30–34 on the "$R_d$" scale, which is a fairly consistent standard throughout the world in view of the common use of certain raw material of various compositions, and has a Blaine fineness of 4200. The reflectance of Grey Plastic Cement, which is used for stucco applications, is 38.0 on the "$R_d$" scale and the Blaine fineness of 5800. The reflectance of light-colored cement (or "Block" cement), which is typically used in concrete block manufacture and masonry applications) is 57.5 on the "$R_d$" scale and has a Blaine fineness of 5800.

Once the preferred, interground, white, blended cement is manufactured with the above processes and apparatus, the preferred, interground, white, blended cement can be used in cementitious products (e.g., concrete, mortar, and plaster) in conventional ways, in that the cement becomes in a primary ingredient in these products.

FURTHER MODIFICATIONS AND VARIATIONS

Although the invention has been described with reference to a specific embodiment, this description is not meant to be construed in a limiting sense. The example embodiments shown and described above are only intended as an example. Various modifications of the disclosed embodiment as well as alternate embodiments of the invention will become apparent to persons skilled in the art upon reference to the description of the invention. For instance, while specific makers and product types of equipment were specified above, other makers and product types may be used in certain circumstances as well. Specifically, a number of separators, such as 16'0" Sturdevant Mechanical Air Separator or Fuller/Hyde O-Sepa Humbolt Wedag—"Stupp" Raymond/ABB, may be used for the separator 11 in FIG. 1. Other air or gravity separators can be used. Similarly, a number of grinders, such as a ball mill manufactured by F. L. Schmidt (e.g., OEM 12'6"×43'0" Unidan mill Symetro driven by 1500 HP synchronous motor at 512 RPM in and 16.2 RPM out) Polysius Fuller Humbolt Wedag Nordberg and Svedala, may be used for the grinding mill 5 in FIG. 1. Also, besides conveyor belts and gravity chutes, alternate transportation equipment or lines may be used for transportation lines 6, 10, 12, 13, 19, 41, 42, 44, 42A, 42B, 42C, 44A, 44B, and 16, such as Cement Pump Mill to Claudius Peters 150 mm—"x" pump pneumatic conveying through 8" $\phi$ pipe and fluidizing air slides, screw conveyors and drag chains.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

What is claimed:

1. An interground, white, blended cement consisting of:
   (a) anhydrous alumino-silicate (2 $SiO_2$—$Al_2O_3$);
   (b) White Portland Cement clinker; and
   (c) white gypsum, wherein said anhydrous alumino-silicate (2 $SiO_2$—$Al_2O_3$), said White Portland Cement clinker, and said white gypsum are interground and in a ratio, said ratio being, by weight, 5–20% said anhydrous alumino-silicate (2 $SiO_2$—$Al_2O_3$), 3–7% said white gypsum, and 73–92% said White Portland Cement clinker.

2. The interground, white, blended cement of claim 1, wherein said white clinker is selected from a group consisting of Type I, Type II, Type III, Type IV, and Type V.

3. The interground, white, blended cement of claim 1, wherein said white clinker has a reflectance of greater than or equal to 80 on a "Rd." scale.

4. The interground, white, blended cement of claim 1, wherein said interground, white, blended cement has a reflectance of 87.5 on a "Rd." scale.

5. The interground, white, blended cement of claim 3, wherein said "Rd." scales is measured by a Hunter Lab colorimeter.

6. The interground, white, blended cement of claim 1, wherein said white clinker has a low percentage of Iron.

7. An interground, white, blended cement, comprising:
   (a) anhydrous alumino-silicate;
   (b) White Portland Cement clinker;
   (c) white gypsum; and
   (d) diatomaceous earth, wherein said diatomaceous earth, said anhydrous alumino-silicate, said White Portland Cement clinker, and said white gypsum are interground together in a ratio, said ratio being, by weight, 5–20% said anhydrous alumino-silicate and said diatomaceous earth, 3–7% said white gypsum, and 73–92% said White Portland Cement clinker.

8. The interground, white, blended cement of claim 7, wherein said white clinker is selected from a group consisting of Type I, Type II, Type III, Type IV, and Type V.

9. The interground, white, blended cement of claim 7, wherein said gypsum is white.

10. The interground, white, blended cement of claim 7, wherein said white clinker has a reflectance of greater than or equal to 80 on a "Rd." scale.

11. The interground, white, blended cement of claim 7, wherein said interground, white, blended cement has a reflectance of 87.5 on a "Rd." scale.

12. The interground, white, blended cement of claim 10, wherein said "Rd."scale is measured by a Hunter Lab colorimeter.

13. The interground, white, blended cement of claim 7, wherein said white clinker has a low percentage of Iron.

14. An interground, white, blended cement, comprising:
   (a) anhydrous alumino-silicate;
   (b) White Portland Cement clinker;
   (c) white gypsum;
   (d) diatomaceous earth; and
   (e) natural pozzolans, wherein said diatomaceous earth, said anhydrous alumino-silicate, said White Portland Cement clinker, said white gypsum, and said natural pozzolans are interground together in a ratio, said ratio being, by weight, 5–20% said anhydrous alumino-silicate and said diatomaceous earth and said natural pozzolans, 3–7% said white gypsum, and 73–92% said White Portland Cement clinker.

15. The interground, white, blended cement of claim 14, wherein said white clinker is selected from a group consisting of Type I, Type II, Type III, Type IV, and Type V.

16. The interground, white, blended cement of claim 14, wherein said white clinker has a reflectance of greater than or equal to 80 on a "Rd." scale.

17. The interground, white, blended cement of claim 14, wherein said interground, white, blended cement has a reflectance of 87.5 on a "Rd." scale.

18. The interground, white, blended cement of claim 16, wherein said "Rd." scale is measured by a Hunter Lab colorimeter.

19. The interground, white, blended cement of claim 14, wherein said white clinker has a low percentage of Iron.

20. An interground, white, blended cement, consisting essentially of:
   (a) anhydrous alumino-silicate (2 $SiO_2$—$Al_2O_3$);
   (b) white Portland cement clinker; and
   (c) white gypsum, wherein said anhydrous alumino-silicate (2 $SiO_2$—$Al_2O_3$), said white clinker, and said white gypsum are interground together in a ratio, said ratio being, by weight, 5–20% said anhydrous alumino-silicate (2 $SiO_2$—$Al_2O_3$), 3–7% said white gypsum, and 73–92% said white Portland cement clinker.

21. The interground, white, blended cement of claim 20, wherein said white clinker is White Portland Cement clinker.

22. The interground, white, blended cement of claim 20, wherein said white clinker is selected from a group consisting of Type I, Type II, Type III, Type IV, and Type V.

23. The interground, white, blended cement of claim 20, wherein said gypsum is white.

24. The interground, white, blended cement of claim 20, wherein said white clinker has a reflectance of greater than or equal to 80 on a "Rd." scale.

25. The interground, white, blended cement of claim 20, wherein said interground, white, blended cement has a reflectance of 87.5 on a "Rd." scale.

26. The interground, white, blended cement of claim 24, wherein said "Rd." scale is measured by a Hunter Lab colorimeter.

27. The interground, white, blended cement of claim 20, wherein said white clinker has a low percentage of Iron.

28. An interground, white, blended cement, consisting essentially of:
   (a) anhydrous alumino-silicate;
   (b) white clinker;
   (c) white gypsum; and
   (d) diatomaceous earth, wherein said diatomaceous earth, said anhydrous alumino-silicate, said white clinker, and said white gypsum are interground together in a ratio, said ratio being, by weight, 5–20% said anhydrous alumino-silicate and said diatomaceous earth, 3–7% said white gypsum, and 73–92% said white clinker.

29. The interground, white, blended cement of claim 28, wherein said white clinker is White Portland Cement clinker.

30. The interground, white, blended cement of claim 28, wherein said white clinker is selected from a group consisting of Type I, Type II, Type III, Type IV, and Type V.

31. The interground, white, blended cement of claim 28, wherein said white clinker has a reflectance of greater than or equal to 80 on a "Rd." scale.

32. The interground, white, blended cement of claim 28, wherein said interground, white, blended cement has a reflectance of 87.5 on a "Rd." scale.

33. The interground, white, blended cement of claim 31, wherein said "Rd." scales is measured by a Hunter Lab colorimeter.

34. The interground, white, blended cement of claim 28, wherein said white clinker has a low percentage of Iron.

35. An interground, white, blended cement, consisting essentially of:
   (a) anhydrous alumino-silicate;
   (b) white clinker;
   (c) white gypsum;
   (d) diatomaceous earth; and
   (e) natural pozzolans, wherein said diatomaceous earth, said anhydrous alumino-silicate, said white clinker, said white gypsum, and said natural pozzolans are interground together in a ratio, said ratio being, by weight, 5–20% said anhydrous alumino-silicate and said diatomaceous earth and said natural pozzolans, 3–7% said white gypsum, and 73–92% said white clinker.

36. The interground, white, blended cement of claim 35, wherein said white clinker is White Portland Cement clinker.

37. The interground, white, blended cement of claim 35, wherein said white clinker is selected from a group consisting of Type I, Type II, Type III, Type IV, and Type V.

38. The interground, white, blended cement of claim 35, wherein said white clinker has a reflectance of greater than or equal to 80 on a "Rd." scale.

39. The interground, white, blended cement of claim 35, wherein said interground, white, blended cement has a reflectance of 87.5 of a "Rd." scale.

40. The interground, white, blended cement of claim 38, wherein said "Rd." scales is measured by a Hunter Lab colorimeter.

41. The interground, white, blended cement of claim 35, wherein said white clinker has a low percentage of Iron.

* * * * *